United States Patent Office 3,293,961
Patented Dec. 27, 1966

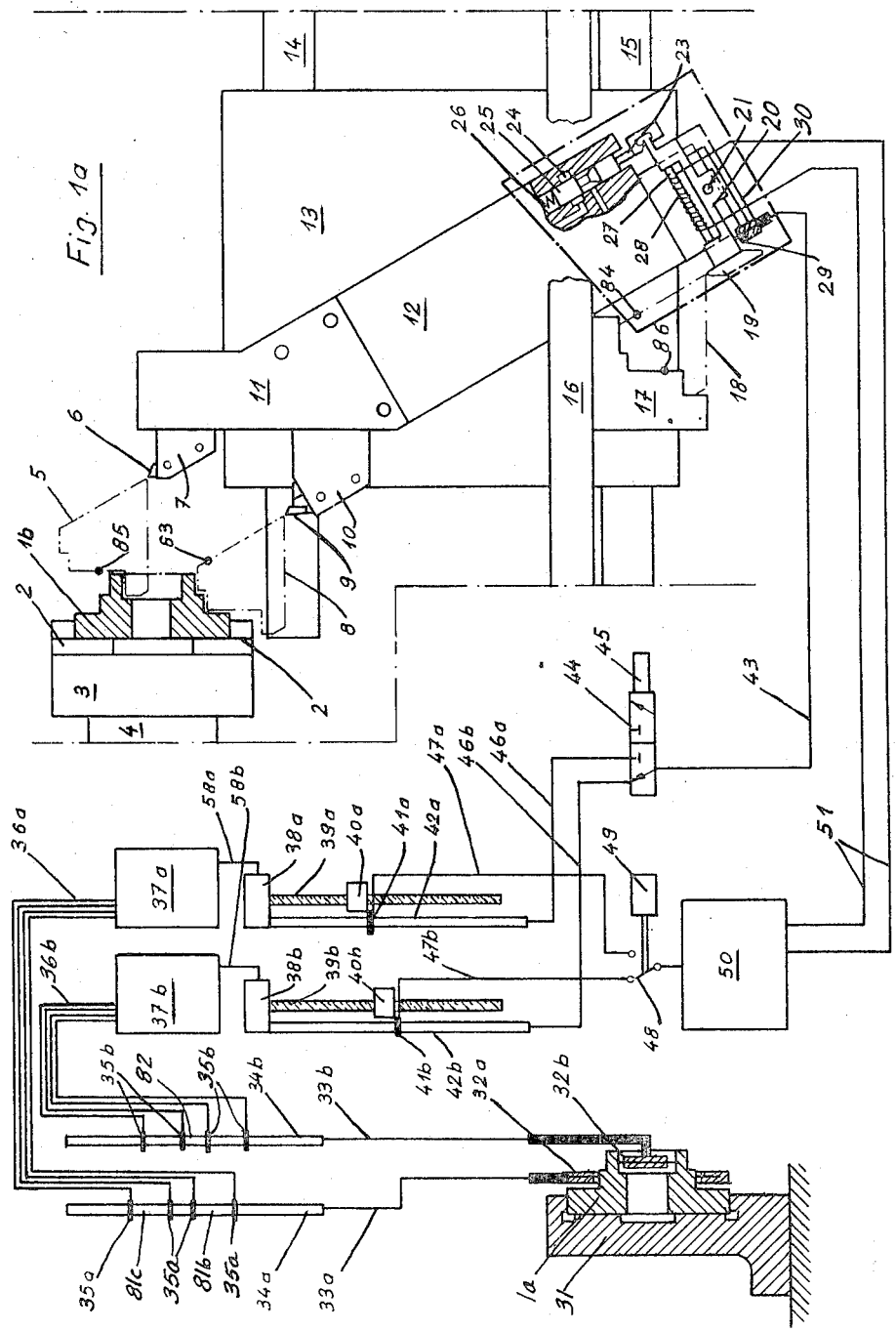

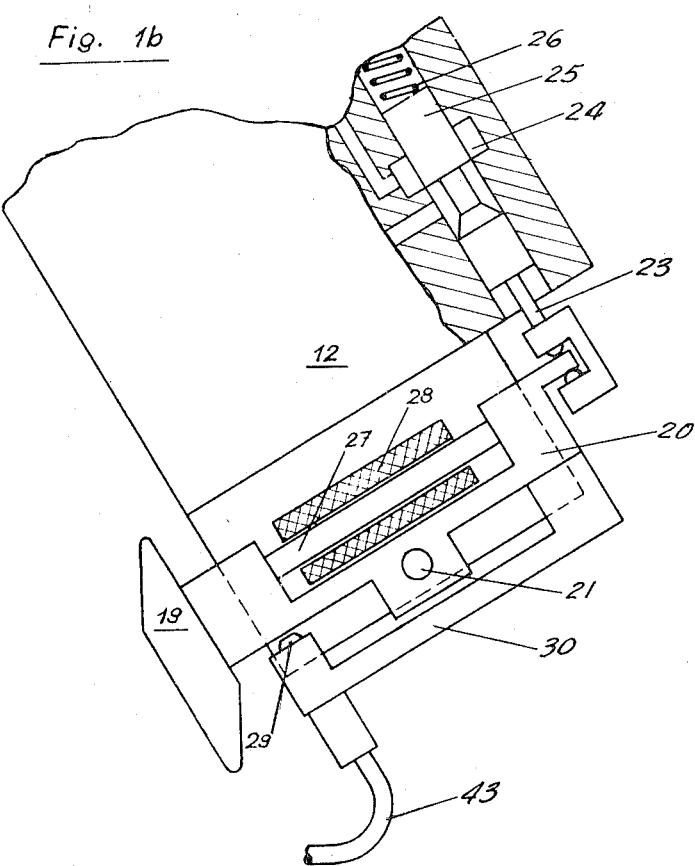

3,293,961
METHOD OF AND DEVICE FOR CONTROLLING MACHINE TOOLS, ESPECIALLY COPYING MACHINES
Eugen A. Matthias, Schaffhausen, Switzerland, assignor to Georg Fischer Aktiengesellschaft, Schaffhausen, Switzerland
Filed Feb. 8, 1965, Ser. No. 430,815
Claims priority, application Switzerland, Feb. 11, 1964, 1,638/64
17 Claims. (Cl. 82—14)

The present invention relates to a method of and a device for controlling machine tools, especially copying lathes with at least two machining tools, in which for purposes of adjusting the relative positions of machining tools and work piece there is provided an elongation bar in combination with a measuring control.

With heretofore customary lathes having a plurality of machining tools, the relative positions of the work piece surfaces to be machined by the machining tools are dependent on the relative positions of the cutting edges of the tools determined by the machining tool carrier or carriers.

With lathes having a plurality of machining tools mounted on one and the same tool carrier, a measuring control of heretofore customary design makes possible to correct the relative position of a single tool only. The lack in precision of the relative positions of the remaining tools may be very considerable depending on the precision of the original adjustment or the wear of the remaining tools. Even when the relative positions of the individual tools have been carefully adjusted, it is possible due to the different wear of the cutting edges of the tools that the relative positions of the cutting edges of individual tools have changed considerably so that an undesired lack of precision in the relative positions of the finished-machined work piece surfaces is encountered which means that undue tolerances will occur with the diameter of the respective work piece.

It is, therefore, an object of the present invention to provide a method of and device for controlling machine tools, especially copying lathes, with a plurality of machining tools, which will overcome the above-mentioned drawbacks.

It is another object of this invention to provide a method of and device for controlling machine tools as set forth above, which will make it possible to correct each individual machining tool in conformity with its own lack of precision.

These and other objects and advantages of the invention will appear more clearly from the following specification in connection with the accompanying drawings, in which:

FIG. 1a is a diagrammatic representation of a measuring control arrangement according to the invention in cooperation with a hydraulic copying lathe having two machining tools.

FIG. 1b illustrates on a larger scale than FIG. 1a that section of the latter which is surrounded by a quadrangle indicated in dot-dash lines.

Figure 2:
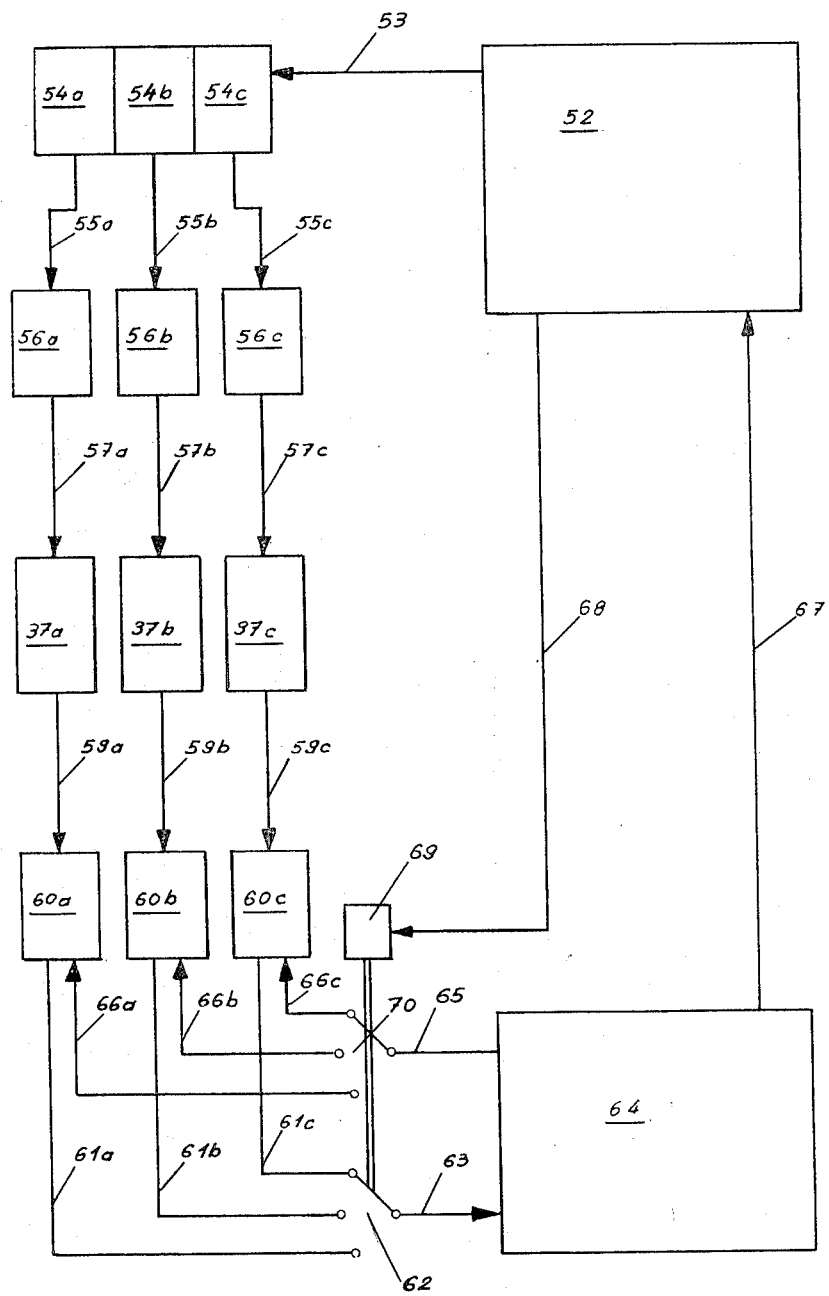
FIG. 2 is a block diagram of a measuring control arrangement for a lathe with three machining tools.

The method according to the present invention is characterized primarily in that the relative positions of at least two machining tools with regard to a work piece are at the latest directly prior to the tools engaging the work piece corrected individually and independently of the position of the other machine tool or tools.

The device for carrying out the just mentioned method is characterized in that the measuring control system has at least two measuring sections each of which has associated therewith measuring control conduit means composed of a plurality of elements known per se and arranged in a suitable sequence for storing and comparing actual values and rated values to thereby form auxiliary correcting values. Each of the measuring sections has furthermore associated therewith means for conveying the correcting auxiliary values to the elongation bar.

Referring now to the drawing in detail and FIGS. 1a and 1b thereof in particular, the arrangement shown therein represents a preferred embodiment of a measuring control according to the present invention in combination with a hydraulically controlled copying lathe with two machining tools and all essential elements necessary for the control measuring of a machined work tool, for the correction of any deviations from the rated dimensions and also for the machining (if necessary after corrective adjustment) for the next following work piece or work pieces.

The arrangement shown in FIGS. 1a and 1b comprises a lathe spindle 4 supporting at one end thereof a work piece 1b clamped for instance between the clamping jaws 2 of a chuck 3. A copying carriage 12 mounted on a carriage 13 is equipped with a tool carrier 11 having two tool supports 7 and 10. Each of said supports 7 and 10 has connected thereto a machining tool 6 and 9 respectively for respectively carrying out machining operations which are independent of each other. Carriage 13 is movable on longitudinal guiding means 14 and 15 provided on a machine bed (not illustrated).

A hydraulic copying control which may be used in connection with the present invention is disclosed more in detail in Swiss Patent No. 277,757. FIGS. 1a and 1b disclose only those parts of a hydraulic copying control which are necessary for an understanding of the present invention. More specifically, FIGS. 1a and 1b show a control valve 25 arranged in copying carriage 12, a control gap 24 and a pressure spring 26 which latter continuously urges a valve rod 23 against one end of a follower or key lever 20. Lever 20 is pivotally supported by bearing means 21 and has its other end provided with a follower or key 19. The non-illustrated machine bed has arranged thereon a templet support 16 having a copying templet 17 detachably connected thereto in customary manner.

The other parts shown in FIGS. 1a and 1b form part of the measuring control, which carries out the control measurements on a machined work piece, compares the measurements with adjusted rated values and in conformity with occurring deviations corrects the carriage control in a suitable manner so that the succeeding work pieces will be machined precisely in conformity with the desired finish measurements. To this end, an already machined work piece 1a is conveyed to a measuring device 31 which has two measuring sections with one measuring element 32a and 32b each. These measuring elements are by means of measuring conduits 33a and 33b respectively connected with the respective columns or indicating tubes of two low pressure indicating gauges (pneumatic measuring devices) 34a, 34b which are known for instance under the name "Solex" measuring devices. The indicating columns of these measuring devices are at certain portions provided with photoelectric cells 35a, 35b which divide the indicating or measuring range in tolerance fields. With each said indicating tube, an intermediate tolerance field 82 defines the tolerance limits of the rated value, whereas oversize dimensions are associated with the upper tolerance fields 81a and undersize dimensions are associated with lower tolerance fields 81b.

The photoelectric cells 35a, 35b on the indicating tubes of the measuring devices 34a and 34b are through electric conductors 36a and 36b connected to control devices 37a and 37b having connected thereto adjusting motors 38a and 38b through the intervention of electric conductors 58a and 58b. The purpose of motors 38a and 38b consists in adjusting photoelectric cells 41a and 41b in conformity with control signals received by photoelectric cells 35a and 35b. This adjustment is effected by rotation of threaded spindles 39a and 39b along further "Solex" indicating tubes 42a and 42b. Photoelectric cells 41a and 41b may for this purpose be connected in a suitable manner with adjusting nuts 40a, 40b mounted on said threaded spindles 39a, 39b respectively. Photoelectric cells 41a, 41b are through the intervention of electric conductors 47a, 47b and through a reversing switch 48 connected to a high frequency generator 50. Connected to generator 50 through high frequency conductors 51 is a heating coil 28 (see also FIG. 1b) of an elongation bar 27 arranged in key lever 20 or at another suitable spot in the hydraulic system of the machine. A measuring element 29 (FIG. 1b) is arranged on a control element influenced by the elongation bar 27, and in the specific example shown on a holding member 30 of key lever 20. This measuring element 29 is connected through a pneumatic conduit 43 through a multi-way valve 44 provided with a suitable actuating mechanism 45 and through conduits 46a, 46b with the "Solex" indicating tubes 42a and 42b respectively.

Generally, the described control device shows two parts of which the first part has as many control conduits as there are measuring sections in device 31 with measuring element 32 which in FIG. 1a have been differentiated from each other by the affix a and b. The second part represents a control circuit which comprises the division of the paths of the indicating tubes 42a and 42b into electric and pneumatic branches and the combination thereof through high frequency generator 50, conductors 51, key lever 20 and conduit 43.

The operation of a control arrangement with two measuring sections in the control measuring device 31 as illustrated in FIGS. 1a and 1b is as follows:

It may be assumed that the work piece diameter as measured by the measuring element 32a is too great and that as a result thereof the liquid column in indicating tube 34a has risen for instance up to the tolerance field 81a, whereas the bore diameter as measured by the measuring element 32b is within the admissible rated range so that the liquid column of indicating tube 32a remains in the tolerance field 82. Due to the control signals received by the photoelectric cells 35a and 35b in control devices 37a and 37b, photoelectric cells 41a and 41b are in devices 42a and 42b moved to the positions corresponding to the ascertained measured values. In conformity with the too large diameter value measured by measuring element 32a and indicated on tube 34a, photoelectric cell 41a is, as indicated in FIG. 1a, moved somewhat higher than cell 41b. Correspondingly, also the liquid column in indicating tube 42a has in connected condition to be pressed higher in order to meet the control function to be performed by photoelectric cell 41a in the high frequency generator 50 and elongation bar-heating circuit. High frequency energy is conveyed by generator 50 to heating coil 28 either permanently or in impulses. This high frequency energy correspondingly heats up elongation bar 27 so that the latter expands and bends key lever 20 with the result that the control gap 24 is adjusted and copying carriage 12 is moved toward the work piece. The bending of key lever 20 is measured by measuring element 29 and is indicated by indicating tube 42a or 42b in conformity with the position of the multi-way valve 44. As soon as the liquid column in the connected indicating tube 42a or 42b has reached the height of its photoelectric cell, the heating up of the elongation bar 27 is interrupted.

The magnitude of the bending of key lever 20 is thus determined by the position of the photoelectric cell of the respective connected indicating tube 42 which was adjusted by the control device in conformity with the deviation measured on work piece 1a. It will thus be evident that the measuring device represents a rated value storage device for the measurement of the key lever bending or of the corrections corresponding to the magnitude of the key lever bending. These corrections are held to the adjusted value by means of the control circuit comprising low pressure measuring or indicating device—reversing switch 48—high frequency generator 50—heating coil 20—multi-way valve 44—low pressure device.

During the machining of work piece 1b, key 19 first moves along path 18 (FIG. 1a) at a slight incline upwardly or inwardly and subsequently along a path in conformity with the copying templet 17. In an analogous manner, tool 9 follows a path 8, and tool 6 follows a path 5. Inasmuch as work piece 1a was assumed to have too large an outer diameter, the relative position of tool 9 must prior to its machining engagement be correspondingly corrected by a corresponding adjustment of copying carriage 12. This is effected by a greater heating up of elongation bar 27 when key 19 has reached position 84 on its path 18 and tool 9 has reached position 83 of its path 8. The higher heating up of elongation bar 27 corresponds to the higher position of photoelectric cell 41a on indicating tube 42a.

Inasmuch as the bore of work piece 1a is within the correct tolerance, the correction necessary for tool 9 must prior to the machining engagement of tool 6 again be nullified. This is effected when key 19 reaches position 86 of its path 18, and tool 6 reaches position 85 of its path 5. These corrections are controlled by control means, known in the art, attached to the carriages 12 and 13 of the machine by shift-over switch 48 for the heating up of the elongation bar and shifting multi-way valve 44 of measuring element 29 for the indicating tube 42b and its photoelectric cell 41b by actuating mechanisms 49 and 45 through known means not illustrated in the drawings. Inasmuch as the change in temperature of the elongation bar 27 and the adjustment of the copying carriage 12 following the shifting requires a certain time, it may become necessary to stop the movement of carriages 12 and 13 prior to the engagement of tool 6, for instance at position 85, until the adjustment of key lever 20 has been completed. The signal to the control arrangement of the machine for continuing the machining operation could be received by photoelectric cell 41b inasmuch as the latter will anyhow emanate a signal when the adjustment of key lever 20 has been completed.

The method and device described above are, of course, also applicable when more than two tools are employed, for instance when the two tools operate simultaneously while a third tool operates prior or latter thereto. In this instance, the correcting adjustments for the first two tools are effected together and for the third tool are effected individually. For completely individual corrections the so-called "successive engagement" is necessary which means that the tools must not engage the work piece at one and the same time.

An embodiment of a measuring control installation according to the invention for machine tools with three completely individually controllable machining tools is illustrated in FIG. 2 by a block diagram in which the individual elements are symbolized by blocks. Block 52 for instance represents a multi-tool copying lathe with three machining tools for "successive engagement." Accordingly, the measuring device is also equipped with three measuring sections 54a, 54b, 54c. The transfer of a machined work piece to the measuring device is symbolized by line 53. From measuring sections 54a, 54b and 54c, conductors lead to rated value storage and comparing devices 56a, 56b and 56c which corrspond to measuring tubes 34a, 34b in FIG. 1a and are in the following description symbolized by this general designation inasmuch as the storage of the rated measurements of the work piece and the comparison with its actual measurements may also be possible by other elements. The diagram furthermore comprises conductors 47a, 47b, 47c, control devices 37a, 37b, 37c, conductors 59a, 59b, 59c and rated value storage means and comparing devices 60a, 60b and 60c for the auxiliary value such as the bending of key lever 20 or the change in the length of the elongation bar. The diagram also comprises conductors 61a, 61b, 61c, a reversing switch 62, a conductor 63, an adjusting device 64, a conductor 65 and a reversing switch 70 which in this arrangement has the function of the multiway valve 44 in FIG. 1a and is equipped with a switchover device 69 adapted also to actuate switch 62. From switch 70, conductors 66a, 66b and 66c lead back to the rated value storage means 60a, 60b and 60c.

The adjusting arrangement 64 which comprises all elements mentioned in connection with the modification of FIG. 1a and pertaining to the control circuit for the auxiliary value including all elements from high frequency generator 50 to measuring element 29, is connected to machine 42 by the elements of the copying control which is symbolized by line 67. By a different type multi-tool lathe, the connection 67 is supposed to comprise all elements between the adjusting member and the tool holder. The arrangement of FIG. 2 furthermore comprises a connecting line 68 for actuating the shifting device 69 by lathe 52.

Figure 3:
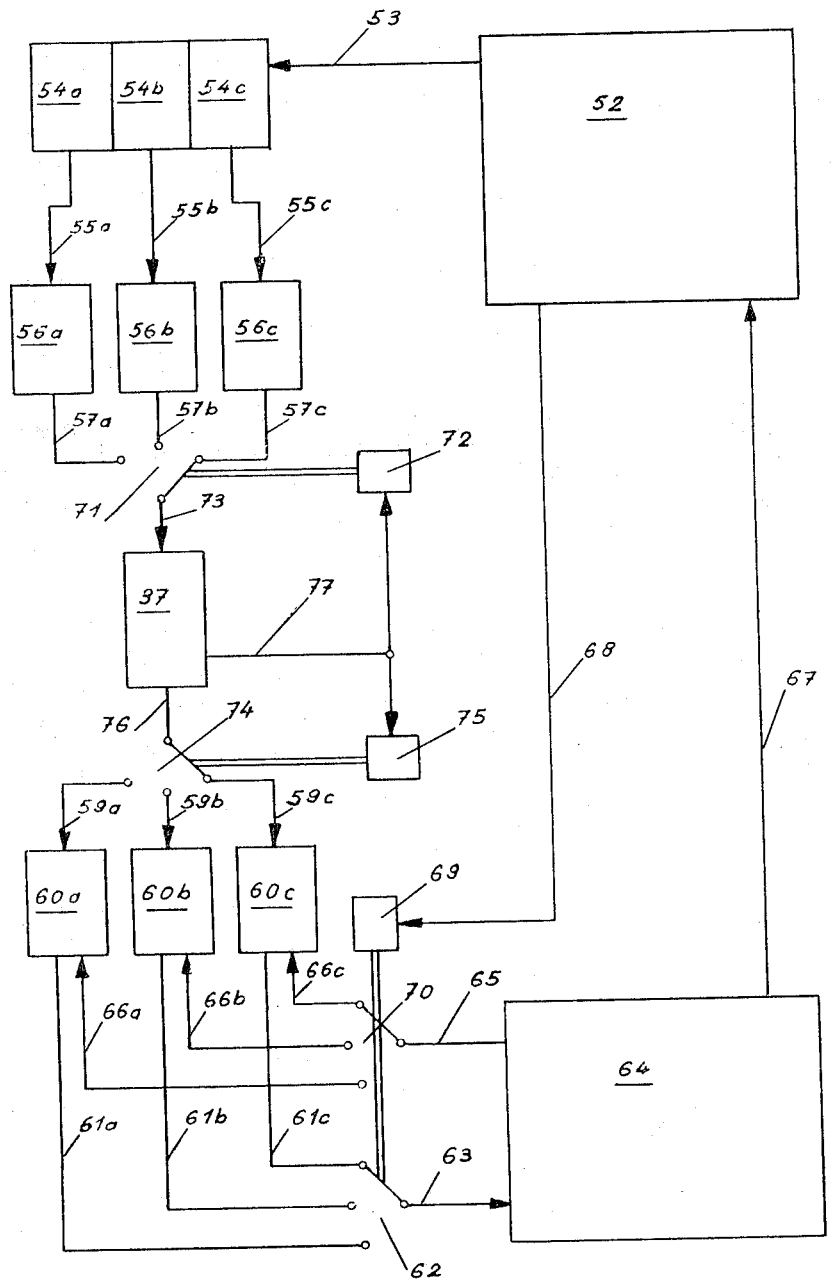
FIG. 3 represents a block diagram of a modified measuring control arrangement according to the present invention.

A further modification of a measuring control for three individually controllable machining tools is illustrated in FIG. 3. This modification represents a simplification over the arrangement of FIGS. 1a and 2. More specifically, according to FIG. 3 the three control devices a, b, c have been replaced by a single control device 37 which by means of shift-over switches 71 and 74 through conductors 57a, 57b, 57c, 73, 76 and 59a, 59b and 59c is sucessively shifted over from each of the three paths a, b, c to the next one. These shift-over operations are effected automatically by shifting devices 72 and 75 respectively associated with the shift-over switches and controlled by control device 37 itself through a signalling conductor 77 each time after the ascertainment of the deviation in measurement has been completed in one storage device, for instance in the rated value storage device and after the correction for the auxiliary magnitude has been effected in a rated value storage device pertaining thereto and comparing device 56a of the same path.

Figure 4:
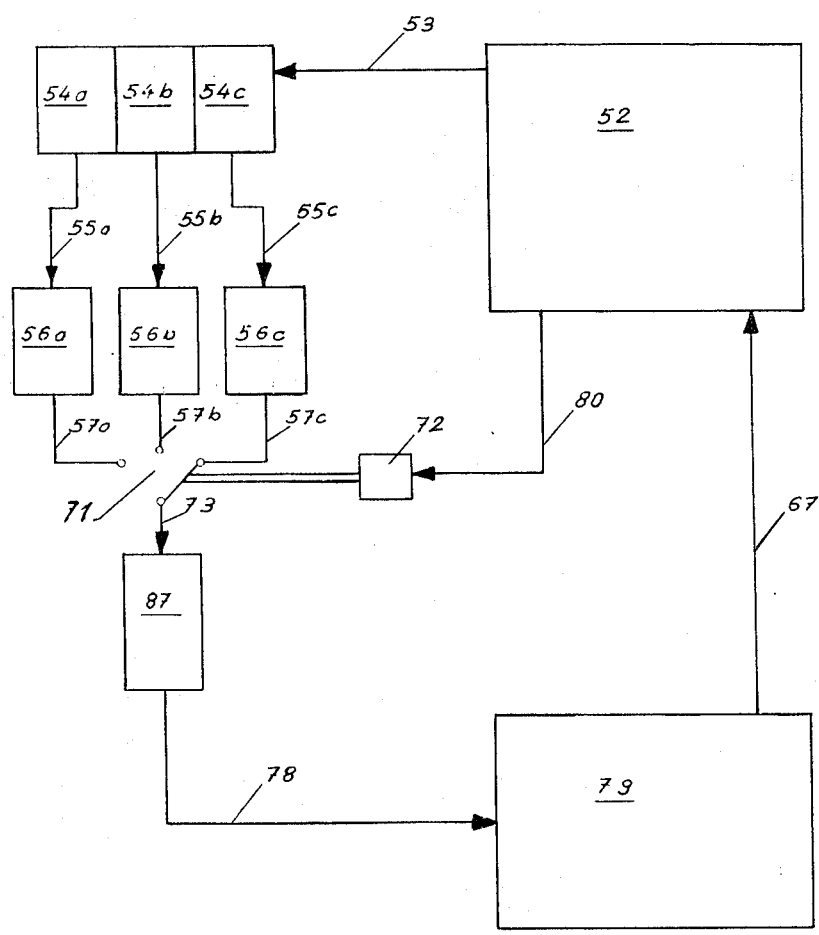
FIG. 4 is a still further modification of a block diagram of a measuring control arrangement according to the invention.

A still further simplified modification for a measuring control for three individually controllable machine tools is illustrated in FIG. 4. This figure shows a diagram of a control arrangement without special control circuit for an auxiliary value, while the same reference numerals designate the same elements as referred to in connection with the other embodiments. According to the arrangement of FIG. 4, the rated value storing and comparing devices 56a, 56b, 56c are connected through conductors 57a, 57b, and 57c with a control device 87 through shift-over switch 71 and conductor 73. Device 87 is adapted to effect the necessary corrections of the relative positions of tool and work piece and, to this end, is through a conductor 78 connected to an adjusting device 79. Device 79 is in a suitable manner symbolized by line 67 operatively connected to lathe 52. In order to be able to shift control device 87 selectively for communication with rated value storing and comparing devices 56a, 56b, or 56c, device 72 of shiftover switch 71 is through conductor 80 connected to a control device in lathe 42 which last mentioned control device brings about the shifting-over of control device 87 when the respective work piece surface pertaining to the respective channel is to be machined.

As will be evident from the above, the new method and arrangement according to the present invention makes possible a highly advantageous employment of the principle of measuring control in connection with machine tools, especially lathes, with a plurality of machining tools. The engagement of each tool is by means of the present invention corrected in conformity with the individual lack of precision of each machining operation of each tool.

It is, of course, to be understood that the present invention is, by no means, limited to the particular arrangements shown in the drawings but also comprises any modifications within the scope of the appended claims.

What is claimed is:

1. A method of controlling machine tools, especially copying lathes having at least two carriage supported independently adjustable and successively effective machining tools and template controlled servomotor and linkage means connected between a template and the carriage for controlling the movement of the carriage which comprises; adjusting the servomotor and linkage means prior to the engagement of each said tool with a workpiece to correct for the individual tool position on the carriage.

2. The method of operating a machine tool such as a copying lathe having means to support a workpiece, a moveable carriage, at least two machining tools fixed to the carriage for successive machining engagement with the workpiece during traversal of the workpiece by the carriage, a template, and linkage means operatively connected to the carriage and including a follower which follows the template during said traversal and actuates the linkage to adjust the carriage position, which comprises; measuring the workpiece last machined, and adjusting the said linkage means prior to the engagement of the respective tools with the workpiece being machined thereby to correct for deviation of the tools from that position on the carriage which would produce workpieces of the proper size.

3. The method of operating a machine tool such as a copying lathe having means to support a workpiece, a moveable carriage, at least two machining tools fixed to the carriage for successive machining engagement with the workpiece during traversal of the workpiece by the carriage, a template, and linkage means operatively connected to the carriage and including a follower which follows the template during said traversal and actuates the linkage to adjust the carriage position, which comprises; establishing predetermined values representing the correct tool position of each tool, establishing other values representing the actual tool position of each tool, comparing said values and thereby obtaining an auxiliary value for each tool, and adjusting the position of each tool individually and prior to the engagement of the respective tool with the workpiece being machined and in conformity with the said auxiliary value pertaining to the respective tool.

4. The method of operating a machine tool such as a copying lathe having means to support a workpiece, a moveable carriage, at least two machining tools fixed to the carriage for successive machining engagement with the workpiece during traversal of the workpiece by the carriage, a template, and linkage means operatively connected to the carriage and including a follower which follows the template during said traversal and actuates the linkage to adjust the carriage position, which comprises; establishing predetermined values representing the correct tool position of each tool, establishing other values representing the actual tool position of each tool, comparing said values and thereby obtaining an auxiliary value for each tool, storing said auxiliary values, and immediately prior to the engagement of each tool with the workpiece being machined adjusting the position of the respective tool relative to the said workpiece and in conformity with the said auxiliary value pertaining thereto.

5. The method according to claim 4 in which said other values are determined by measuring the workpiece last machined.

6. The method according to claim 5 in which the adjustment of the positions of the tools is effected by adjustment of said linkage means.

7. In a copying machine tool having a spindle for supporting a workpiece to be machined, a tool supporting carriage for traversal of the workpiece, at least two machining tools in the carriage for successive machining engagement with the workpiece being machined during said traversal, a template, and linkage means including a follower to follow said template during said traversal and operatively connected to said carriage to control movement thereof, and adjusting means for adjusting the effective machining position of each said tool individually and prior to engagement by the respective tool of the workpiece being machined.

8. In a copying machine tool having a spindle for supporting a workpiece to be machined, a tool supporting carriage for traversal of the workpiece, at least two machining tools in the carriage for successive machining engagement with the workpiece being machined during said traversal, a template, and linkage means including a follower to follow said template during said traversal and operatively connected to said carriage to control movement thereof, adjusting means for adjusting said linkage means to adjust the path followed by the carriage, and control means for actuating said adjusting means prior to the engagement of each tool with the workpiece being machined and in conformity with the displacement of the respective tool from the position thereof necessary to produce a workpiece of proper dimensions.

9. In a copying machine tool having a spindle for supporting a workpiece to be machined, a tool supporting carriage for traversal of the workpiece, at least two machining tools in the carriage for successive machining engagement with the workpiece being machined during said traversal, a template, and linkage means including a follower to follow said template during said traversal and operatively connected to said carriage to control movement thereof, adjusting means for adjusting said linkage means to adjust the path followed by the carriage, control means connected to said adjusting means for supplying actuating signals thereto, means connected to said control means to regulate the signals supplied thereby to said adjusting means, and feed back means connected between said linkage means and said control means to interrupt said signals when the adjustment corresponding to the signals has been made.

10. In a copying machine tool having a spindle for supporting a workpiece to be machined, a tool supporting carriage for traversal of the workpiece, at least two machining tools in the carriage for successive machining engagement with the workpiece being machined during said traversal, a template, and linkage means including a follower to follow said template during said traversal and operatively connected to said carriage to control movement thereof, adjusting means for adjusting said linkage means to adjust the path followed by the carriage, control channel means, means for storing a measured value in said channel means pertaining to each tool and which is in conformity with the measurement of a previously machined workpiece, and means for supplying actuating signals from said channel means to said adjusting device prior to the engagement of a respective tool with the workpiece being machined and in conformity with the measured value stored in the channel means and pertaining to the respective tool.

11. In a copying machine tool having a spindle for supporting a workpiece to be machined, a tool supporting carriage for traversal of the workpiece, at least two machining tools in the carriage for successive machining engagement with the workpiece being machined during said traversal, a template, and linkage means including a follower to follow said template during said traversal and operatively connected to said carriage to control movement thereof, adjusting means for adjusting said linkage means to adjust the path followed by the carriage, a control channel pertaining to each tool, means for supplying a measured value to each channel in conformity with the measurement of a previously machined workpiece and for storing said values therein, control device means for supplying actuating signals to said adjusting device, and means for actuating said control device means in accordance with the value stored in each said channel prior to the engagement of the tool pertaining to the respective channel with the workpiece being machined.

12. In a copying machine tool having a spindle for supporting a workpiece to be machined, a tool supporting carriage for traversal of the workpiece, at least two machining tools in the carriage for successive machining engagement with the workpiece being machined during said traversal, a template, and linkage means including a follower to follow said template during said traversal and operatively connected to said carriage to control movement thereof, adjusting means for adjusting said linkage means to adjust the path followed by the carriage, a control channel pertaining to each tool, means for supplying a measured value to each channel in conformity with the measurement of a previously machined workpiece and for storing said values therein, control device means for supplying actuating signals to said adjusting device, and means for connecting said control device to the control channel pertaining to a respective tool prior to the engagement of the workpiece being machined by the respective tool, each said channel being operable when connected to said control device for controlling the supply of signals from the control device to the adjusting means in conformity with the measured value stored in the respective channel.

13. A copying machine tool according to claim 11 in which said control device means is a single control device, and switch means for successively connecting said control device in the respective control channels.

14. A copying machine tool according to claim 13 in which said switch means are under the control of said control device and are operated when an adjusting operation pertaining to a channel is completed.

15. A copying machine tool according to claim 13 in which said switch means is operated by said machine tool.

16. A copying machine tool according to claim 7 in which said adjusting means includes means in the linkage means sensitive to temperature.

17. A copying machine tool according to claim 8 in which said linkage includes a lever pivoted between its ends, a bar connected to said lever and expansible for bending the lever, and said control means includes means for heating said lever to cause expansion thereof.

References Cited by the Examiner

UNITED STATES PATENTS 3,073,185   1/1963   Hoffmann _____ 77—4

FOREIGN PATENTS 802,206   10/1958   Great Britain.

WILLIAM W. DYER, Jr., *Primary Examiner.*

G. A. DOST, *Assistant Examiner.*